(No Model.)
C. W. EMERSON & C. H. LINDHOLM.
FRICTION DEVICE FOR TRANSMITTING POWER.
No. 263,032. Patented Aug. 22, 1882.
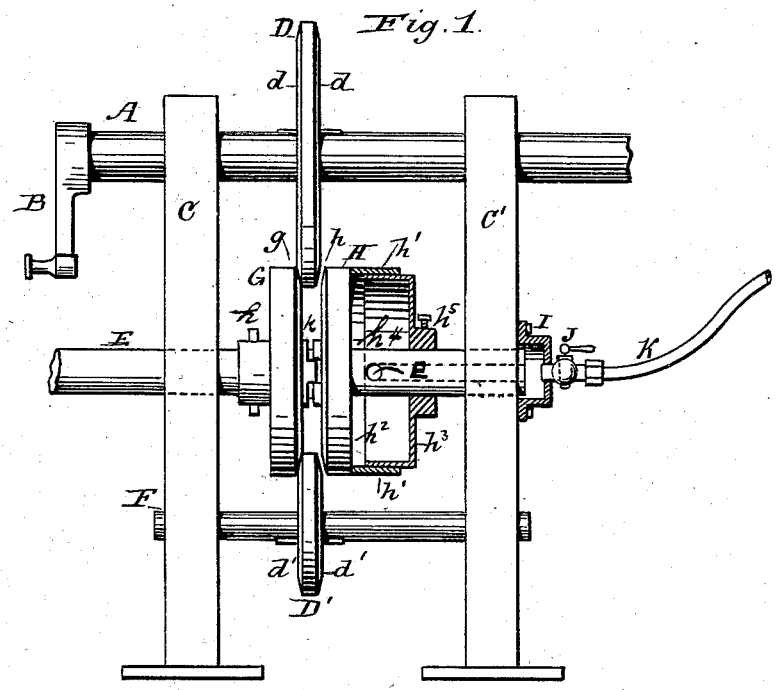
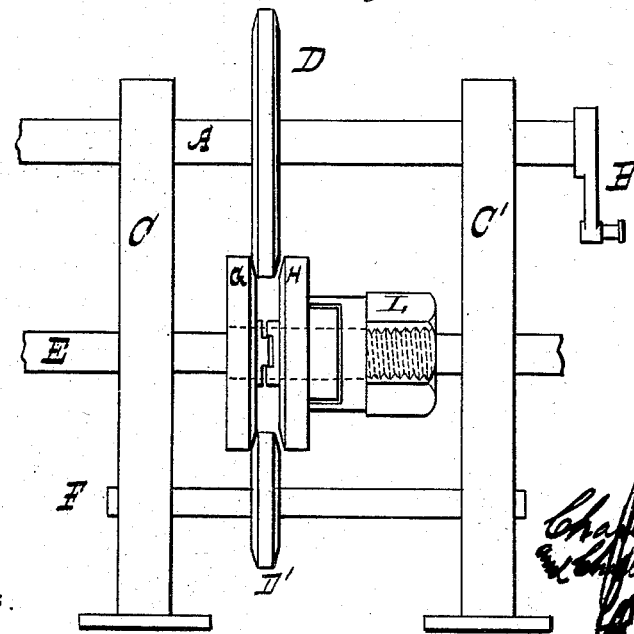
Witnesses.
Inventors

UNITED STATES PATENT OFFICE.

CHARLES W. EMERSON, OF NEW YORK, N. Y., AND CHARLES H. LINDHOLM, OF JERSEY CITY, NEW JERSEY.

FRICTION DEVICE FOR TRANSMITTING POWER.

SPECIFICATION forming part of Letters Patent No. 263,032, dated August 22, 1882.

Application filed January 14, 1882. (No model.)

*To all whom it may concern:*

Be it known that we, CHARLES W. EMERSON and CHARLES H. LINDHOLM, citizens of the United States of America, residing at New York, N. Y., and Jersey City, New Jersey, respectively, have invented certain new and useful Improvements in Friction Devices for Transmitting Power and a Method of Operating the Same; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to means for receiving power from one mechanism and transmitting it to another; and it consists in certain devices constructed and operating in the manner hereinafter described, and specifically set forth in the claims.

Figure 1 represents in plan and partly in section one arrangement of our devices, and Fig. 2 a modified form of a portion of said devices.

It is well known that in friction-clutches as heretofore constructed and operated the application of one member thereof to the other has been in some cases effected suddenly, producing great wear upon machinery operated thereby, and in such cases and all others employing said clutches the necessary pressure exerted by one member of the clutch against the other has been applied or transmitted transversely to the shaft upon which they are mounted, and from thence to the bearings of said shaft, resulting in increased friction and wear at such points.

The object of our invention is to overcome these objections, thereby reducing wear of machinery and useless expense of power, and, further, to provide means for the transmission of power from one mechanism to another or from one member of a machine to another in such quantity or extent as may be desired or required for a given purpose, and to cause such transmission to be yieldingly accomplished in order that the operation of the machine may be smooth and the friction of its moving parts evenly and properly distributed.

In the drawings we have illustrated mechanism, arranged in conjunction with the devices involving our invention, in extent sufficient to a clear understanding thereof.

A represents any power-driven shaft, to which the power may be applied by means of the crank B, or it may be by a belt-pulley, sprocket-wheel, or any other suitable means which shall rotate the shaft. The shaft A runs in bearings in the frame-work C C', as do the shafts E and F, said frame-work and bearings being of any usual and suitable construction.

Upon the shaft A is a friction wheel or disk, D, the sides and face of which are removed to form beveled contact-surfaces $d$ $d$, as shown. On the shaft F is a similar disk, D', having similar beveled contact-surfaces $d'$ $d'$; but this latter shaft and disk are not essential to the practical operation of our invention, they being added to equalize the friction of the moving parts of the machine, and for such purpose they may be employed.

On shaft E is rigidly secured a wheel or disk, G, having a beveled contact-surface, $g$, disposed at an angle which agrees with that of the contact-faces of disks D and D'. Said disk G is secured to the shaft E by a pin, $h$, or it may there be rigidly secured by a set-screw, key, spline, or any well-known means.

Upon the inner hub of the disk G is formed an offset or offsets to co-operate with coincident insets upon the hub of the opposite disk, H, and act as a clutch of ordinary construction, but so deeply intermeshed that they do not separate when the disk H is not in contact with the disks D and D' at its contact-surface, $h$, of equal inclination to those of said disk D. The disk H is loosely fitted to the shaft E, and is provided with flanges $h'$, forming therein a gas, air, steam, and liquid tight chamber, $h^2$, the same being closed by a head, $h^3$, having flanges $h^4$ extending into the chamber $h^2$, said head being rigidly attached to the shaft E at $h^5$ by any suitable means. The shaft E is hollow from its end to a port, $e$, leading into the chamber $h^2$, and is at its end covered by an air, gas, and steam or liquid tight box or chamber, I, secured to the frame-work C', communication into which is had through the valve J, connecting with the pipe K.

Such is the construction of this form and application of our invention.

The operation is as follows: The pipe K is connected to a source of pressure, and this may be a steam-boiler, an air-compressing apparatus, a force-pump, or a reservoir (elevated) of water, or any means of producing a stream of gas, steam, vapor, or water or liquid under pressure in the pipe. Power being applied to the shaft A, it revolves, and with it the disk D, and so long as no pressure is admitted into chamber $h^2$ shaft E remains stationary; or, if desired, disks D, D', and G may have such a contact as would cause shaft E to overcome a minimum amount of resistance by whatever machinery is attached to be operated thereby, so as to rotate until such minimum of resistance is exceeded by, for instance, the increased work regularly or irregularly required to be performed by said machinery, at which time pressure may be by valve J admitted through port $e$ into chamber $h^2$, when disk H is forced by said pressure against disks D D', and the excess of resistance to the rotation of shaft E is overcome, and this pressure may be increased and diminished at will in suddenness or extent, resulting in smoothness of motion and adaptability of required force to the resistance to be overcome, and this automatically, if desired, by means not herein shown nor disclosed, as it is withheld to form the subject-matter of a subsequent application; but in case disks D, D', and G are out of such contact and pressure be admitted into chamber $h^2$, disk H is forced against D and D', and they, being attached to their shafts by splines which permit of their longitudinal movement thereon, are forced against disk G and cause it to rotate shaft E. At this point of the operation it will be seen how advantageously the application of the elastic force of liquid or gaseous pressure can be employed, not only in varying force, but in such graduation as to produce a start which is not only positive but free from suddenness, and at the same time, if the machinery be in motion, its resistance by the work to be accomplished may be suddenly, regularly, or intermittently overcome. If the nature of this resistance is regular for stated times, the pressure of disk H may be sustained at a desired point by means of the modification shown in Fig. 2, wherein said disk is represented as being constructed so that it can be adjustably set to a desired degree of pressure by means of the screw-threaded flanged head L.

By this construction all of the advantages of an equalizing distribution of the friction of the moving parts are secured, and a desired increase or decrease of pressure may be applied either gradually or suddenly.

The applications of our invention are numerous. By a proper selection of pressure-source it may be applied to running, starting, and stopping sewing, sawing, planing, drilling, hoisting, pressing, and, in fact, any and all machines adapted to receive and transmit power.

It is well known that beveled wheels working in contact with each other and rigidly mounted on different shafts have been employed for the transmission of power, and that in hoisting-machines friction devices have been applied to the drum or pulley by means of steam, and this for the purpose of rendering the drum operative or non-operative, and this we do not claim as of our invention.

Having described our invention and its operation, what we claim as new, and desire to secure by Letters Patent, is—

1. The arrangement of mechanism herein shown and described, which consists of the beveled wheels adapted to move longitudinally upon their shafts for the transmission of power by means of frictional contact, the pressure to insure said contact being applied and directed in line with the shaft, and by means substantially as and for the purpose set forth.

2. The arrangement of mechanism herein shown and described, which comprises beveled wheels adapted to move longitudinally upon their shafts, and adapted to be forced into contact by pressure applied in line with their shaft, and supplied by a compressed vapor, gas, or liquid, substantially as and for the purpose set forth.

3. The combination of a power-driven shaft, upon which is mounted a beveled wheel adapted to move longitudinally upon its shaft, with a power-transmitting shaft provided with a second rigidly-mounted bevel-wheel, and a companion beveled wheel, adapted, substantially as shown and described, to be forced along said shaft by compressed vapor, liquid, or gas, as and for the purpose set forth.

4. The combination of the shaft A, disk D, shaft E, and disk G, constantly clutched to disk H, with means for forcing the disks together, all substantially as shown and described.

5. The combination of shaft A, disk D, movable longitudinally thereon, shaft E, rigidly-attached disk G, shaft F, disk D', movable longitudinally thereon, and disk H, adapted to be moved longitudinally on shaft E, substantially as shown and described.

6. The combination of shafts A and E, disk D, movable longitudinally on its shaft, and disk G, rigidly attached to its shaft, with chambered disk H, head $h^3$, and means for introducing air, gas, vapor, or liquid under pressure, all substantially as shown and described.

7. The hollow shaft E, provided with the port $e$ and disk G, provided with one member of a clutch, as $k$, in combination with a chambered disk provided with the other member of a clutch, as $k$, said members being arranged to be always in contact, said chambered disk being movable longitudinally on the shaft, a fixed chambered disk, and means for introducing air, gas, vapor, or liquid under pressure into the shaft, all substantially as shown and described.

8. The combination, with the shaft E, chambered disks H $h^3$, cap I, valve J, and pipe K, substantially as shown and described.

In testimony whereof we have affixed our signatures in presence of two witnesses.

CHARLES W. EMERSON.
CHARLES H. LINDHOLM.

Witnesses:
CHARLES H. ADLER,
JOHN H. MOELLER.